(No Model.)
A. OLIVER.
QUARTZ CRUSHER.
No. 252,792. Patented Jan. 24, 1882.
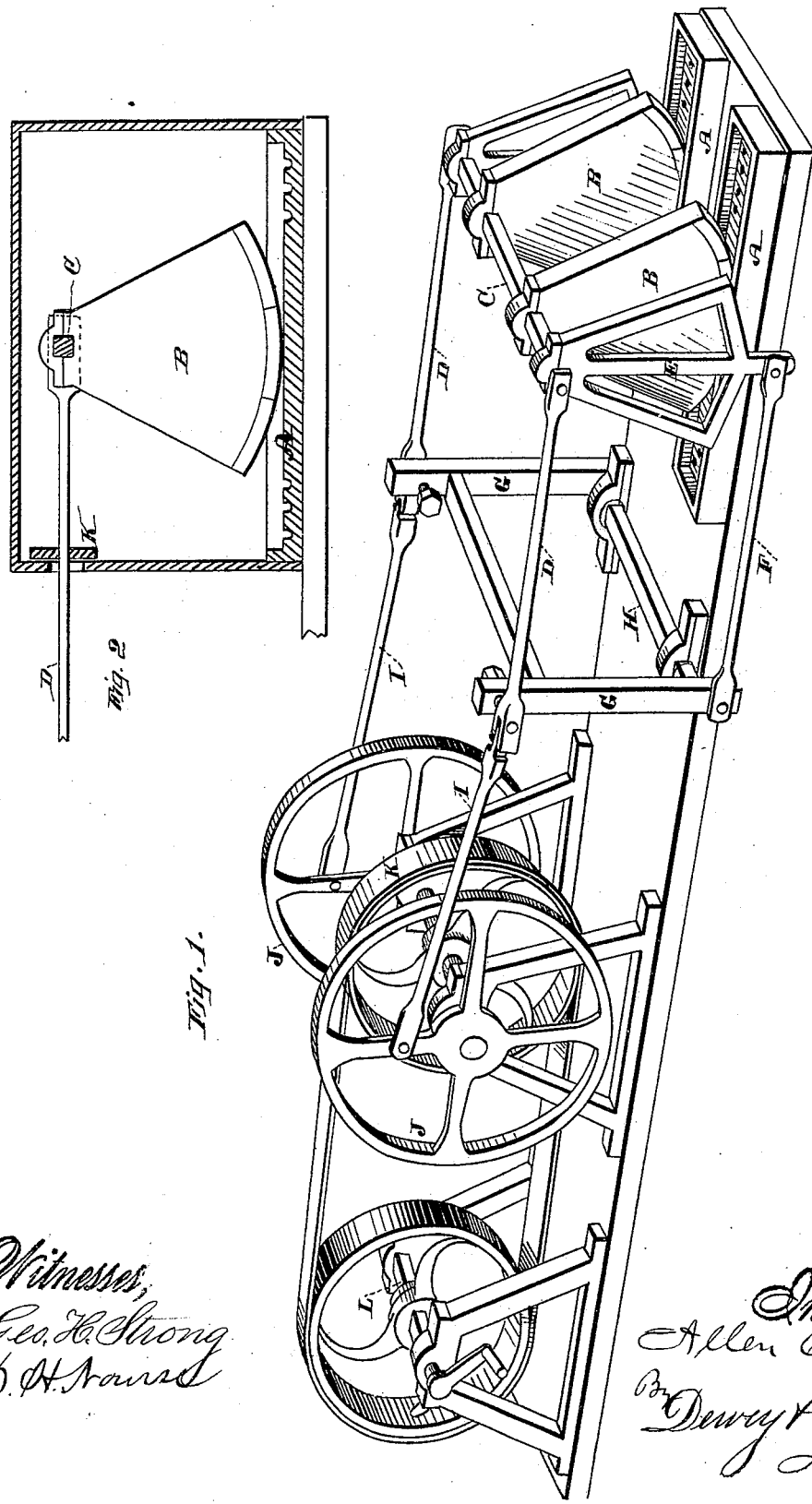
Witnesses,
Geo. H. Strong
D. H. Norris
Inventor
Allen Oliver
By Dewey & Co.
Att'ys

UNITED STATES PATENT OFFICE.

ALLEN OLIVER, OF FOREST HILL, CALIFORNIA.

QUARTZ-CRUSHER.

SPECIFICATION forming part of Letters Patent No. 252,792, dated January 24, 1882.

Application filed June 22, 1881. (No model.)

*To all whom it may concern:*

Be it known that I, ALLEN OLIVER, of Forest Hill, county of Placer, State of California, have invented an Improved Quartz-Crusher; and I hereby declare the following to be a full, clear, and exact description thereof.

My invention relates to certain improvements in quartz or rock crushing mills, in which a reciprocating rolling weight is fitted to oscillate upon a bed or mortar into which the material to be crushed is fed, and it is more especially applicable to an apparatus for which Letters Patent were issued to me February 20, 1877.

It consists in an improved means for producing the reciprocating rolling motion of the segmental crushers and in keeping them in place so that they do not slip in the mortars, while they are allowed to rise and fall as the material beneath them increases or diminishes. This is effected by a series of connecting rods which produce a parallel motion, these rods passing through holes in guides which move vertically on the closed mortar or box, so as to keep a tight joint, while allowing the rods to move up and down in their oscillation, all of which will be hereinafter described, and the points of novelty set forth in the claims.

Referring to the accompanying drawings for a more complete explanation of my invention, Figure 1 is a perspective view of my invention. Fig. 2 is a section.

The mortar-beds A of my apparatus are supported upon a strong frame or bed, and there are as many as may be desired placed side by side, and provided with any suitable feeding devices or apparatus. Within these mortars the segmental crushing-weights B are fitted, so that their rims or crushing-faces will rest upon the bed, as shown. These segments may be united so as to stand side by side, each segment standing in its own mortar, and a shaft, C, passes through their upper ends extending out upon each side so as to receive the ends of the pitman or connecting rods D, by which the segments are caused to roll or oscillate. An arm or plate, E, extends downward from this shaft upon each side to a point below the level of the mortar-bed, or the bottom of the segments, and rods F extend back from pins upon these arms. The rods D and F are connected with rocker-arms G, which are united by a shaft, H, turning in suitable boxes, and whose length corresponds with that of the arms E, so that the rods D unite the upper ends of the arms E G and the rods F unite their lower ends, and when oscillated they form a parallel motion, which prevents the segments B from slipping in the mortar, but allows them to rise and fall to accommodate themselves to the amount of material in the battery without in any way deranging their motion.

Connecting-rods I unite the rocker-arms G with the crank-wheels J, and these may be driven by any suitable power. In the present case a main pulley, K, is fixed upon their shaft, and a belt from a pulley upon the countershaft L serves to drive it.

When used in dry crushing the whole battery is inclosed in a box or close case, and the rods D and F enter through openings in slides K, which move up and down in guides in the side of the case. This allows the slight movement up and down of the rods as they reciprocate, and the holes through which they pass are suitably packed to prevent any escape of dust.

Having thus described my invention, what I claim as new, and desire to secure by Letters Patent, is—

1. The mortars A and segmental crushers B, having the curved peripheries reciprocating in said mortars, in combination with the rocker-arms E and G and the parallel rods D and F, substantially as and for the purpose herein described.

2. The mortars A, reciprocating crushers B, having the curved faces moving upon the mortars, the rocker-arms G E, and the parallel driving and check-rods D F, as shown, in combination with the case inclosing the mortars and the slides K, perforated to allow the rods to pass, substantially as herein described.

In witness whereof I have hereunto set my hand.

ALLEN OLIVER.

Witnesses:
S. H. NOURSE,
JEROME F. KENDALL.